United States Patent

Grüne

[11] 4,225,411
[45] Sep. 30, 1980

[54] SUPPORT FRAME FOR ELECTROLYTE CHAMBERS IN ELECTROCHEMICAL CELLS

[75] Inventor: Horst Grüne, Erlangen, Fed. Rep. of Germany

[73] Assignee: Siemens Aktiengesellschaft, Munich, Fed. Rep. of Germany

[21] Appl. No.: 856,491

[22] Filed: Dec. 1, 1977

[30] Foreign Application Priority Data

Dec. 10, 1976 [DE] Fed. Rep. of Germany ....... 2656083

[51] Int. Cl.² .................. C25B 11/00; H01M 8/02
[52] U.S. Cl. .................................. 204/286; 429/39
[58] Field of Search ............... 204/279, 286, 257, 288, 204/269, 270, 129; 429/38, 39, 44

[56] References Cited

U.S. PATENT DOCUMENTS

| | | | |
|---|---|---|---|
| 3,251,764 | 5/1966 | Miller et al. | 204/275 X |
| 3,615,852 | 10/1971 | Gehring | 429/38 |
| 3,663,412 | 5/1972 | Kling et al. | 204/257 |
| 3,948,750 | 4/1976 | Figueras et al. | 204/286 |
| 3,959,017 | 5/1976 | Louis et al. | 429/38 X |
| 4,051,009 | 9/1977 | Schweickart et al. | 204/279 |
| 4,056,458 | 11/1977 | Pohto et al. | 204/257 X |
| 4,069,129 | 1/1978 | Sato et al. | 204/257 X |

Primary Examiner—John H. Mack
Assistant Examiner—D. R. Valentine
Attorney, Agent, or Firm—Kenyon & Kenyon

[57] ABSTRACT

A support frame for electrolyte chambers in electrochemical cells with supported electrodes, having parallel wires extending in the direction of flow of the electrolytic liquid and arranged preferably between two thin screens, wherein the flow canals for the electrolytic liquid are substantially free of constrictions in the direction of flow.

6 Claims, 3 Drawing Figures

SUPPORT FRAME FOR ELECTROLYTE CHAMBERS IN ELECTROCHEMICAL CELLS

BACKGROUND OF THE INVENTION

1. Field of the Invention

This invention relates to a support frame for electrolyte chambers in electrochemical cells with supported electrodes and in water depletion cells.

2. Description of the Prior Art

Electrochemical cells with supported electrodes are known. See, e.g., U.S. Pat. Nos. 3,471,336; 3,480,538 and 3,554,812. In such cells a porous support frame, which contains an aqueous electrolyte and defines the electrolyte chamber, is arranged between thin electrodes. Usually a cover layer is positioned between at least one electrode and the support frame. Such a cover layer is gastight when saturated with electrolyte and prevents any reaction gas from entering the electrolyte chamber. On the side facing away from the support frame or the cover layer, the powder electrodes are held by a net or screen which also serves as a contact. Additional screens support the reaction gas chamber.

The support frame in such electrochemical cells not only conducts the electrolyte through inlets and outlets, but also spaces the electrodes. In addition the support frame is permeable in two dimensions and allows a flow of ions from one electrode to the other. To perform the above functions, the support frame must be porous, but may consist of any desired material such as ceramic, glass, or plastic. Generally, the support frames are metallic screens and may have coarse pores in the middle region with fine pores in regions adjacent to the electrodes.

With respect to fuel cells, life tests have shown that perfect gas seals cannot be obtained since reaction gases such as hydrogen or oxygen pass into the electrolyte chamber from the gas chamber through small leaks in the cover layers. Reaction gas may also enter the electrolyte chamber by diffusion due to the difference in pressure between the gas and the electrolyte chamber. Such gases passing into the electrolyte chamber can degrade the operation of the cell even if only a small gas leak exists. Especially at higher current densities, gas losses of 1 ml/min per cell can create operational problems although such losses amount to less than 0.1% of the flow through.

The gases passing into the electrolyte chamber collect as bubbles which are held in part by capillary forces in the meshes of the screens serving as the support frame and cannot be removed, or only partially so, by the electrolyte flow. These gas bubbles increase the internal resistance of the cell, thereby causing a drop in cell voltage, and inhibit the current flow. If the gas distribution is not uniform and especially at large current densities such as 300 mA/cm$^2$ and higher these gas bubbles cause non-uniform current density distribution and resultingly local overheating in the electrolyte and at the electrodes, leading to evaporation of water and further development of gas bubbles. In addition, the gas bubbles create an uneven flow of the electrolyte through the cell, thereby providing less local cooling and further heat build up.

Problems also arise in water separation cells (water depletion cells), due to gas bubble accumulation in the electrolyte chambers. Water separation cells, which provide for the removal of reaction water from the electrolyte of fuel cells, comprise an electrolyte chamber for the flow of an electrolytic liquid and at least one gas chamber separated therefrom by a diaphragm and into which water evaporates from the electrolyte chamber through the diaphragm. Generally, the electrolyte chamber and the gas chamber are supported by at least one screen, e.g., U.S. Pat. No. 3,783,107. If gas bubbles collect in the meshes of the screen present in the electrolytic chamber, freshly hot electrolytic liquid no longer arrives at these locations and the water evaporation rate decreases.

SUMMARY OF THE INVENTION

According to the present invention, the problems which occur in the operation of electrochemical and water separation cells due to the accumulation of gas bubbles in the electrolyte chambers are eliminated.

The solution of the above problems is achieved by a support frame that provides substantially constriction free flow canals for the electrolytic liquid. Absence of constrictions avoids relatively high capillary differences in pressure within the flow canals of the support frame which prevent the removal of gas bubbles. The support frame according to the present invention exerts no appreciable capillary forces on gas bubbles.

If the customary screens are used as the support frame, capillary differences in pressure as high as 4,000 dynes/cm$^2$, equivalent to a 40 mm water column can occur. With a bubble length of 1 mm, the pressure gradient in the electrolyte would then have to be 40 mm water column per millimeter and the total pressure drop in the electrolyte about 0.7 bar, which is not technically feasible.

In the support frame according to the present invention, this difficulty does not exist, and in addition, flow around bubbles is prevented and the total pressure drop acts as dynamic pressure due to the largely uniform flow canals.

The support frame according to the present invention can advantageously have two porous boundary regions, between which cross pieces may be arranged in the flow direction of the electrolytic liquid spaced from each other and extending parallel to one another. For this purpose, relatively thick wires may be used which extend parallel to the flow direction and are connected on both sides by relatively thin wires lying transverse to the flow and supporting the cover layers. Such an arrangement has a relatively small overall thickness thereby resulting in a low internal resistance. With a support frame thickness of about 0.56 mm, a capillary difference in pressure of only 3 mm water column is present with a tolerance of −10% (and a corresponding deviation in the canal geometry). This means that bubbles of about 3 mm length rise in the electrolytic liquid due to buoyancy alone and exit from the electrolyte chamber.

Such a support frame consisting only of wires has intrinsic manufacturing difficulties which stem from the necessity of connecting a multiplicity of wires perpendicularly to each other. In a preferred embodiment of the support frame according to the present invention, wires extending parallel to one another are spaced from each other between two thin screens in the flow direction of the electrolytic liquid. Such a design greatly simplifies production since the wires need only be connected to a fabric, i.e., a screen. In addition, it is sufficient in this embodiment if the wires, which generally have a diameter ranging between 0.4 and 0.6 mm, are fastened by cementing or welding to just one of the screens while the second screen is then simply placed on the wires. The overall thickness of such an arrangement (the thickness of the screens being generally between about 0.1 and 0.3 mm) is not appreciably larger in comparison to the embodiment constructed from wires alone so that even here the gas bubbles are removed from the support frame in a simple manner.

In yet another advantageous embodiment, the support frame of the present invention is constructed from three thin fabrics in the manner of corrugated board. Such a support frame has two thin, porous boundary regions, particularly thin screens sandwiching a corrugated, i.e., folded or bent, screen creating relatively large flow canals for the electrolytic liquid. Depending on the shape of the middle screen, a more or less elastic arrangement can be obtained with this embodiment of the support frame.

A still further support frame embodiment dispenses with the thin, outer boundary regions altogether. But to ensure a support for the cover layers or diaphragms, thin, porous, fabrics, particularly screens, are used as support frames, which are wound or folded in meander like fashion. The screens should be maximally about 0.15 mm thick and have a mesh width as small as possible in order to prevent as completely as possible cross flow between the individual flow canals formed by the folds.

The support frame of the present invention is preferably metallic, such as nickel, and/or plastic. Stainless steel or nickel plated iron support frames find particular application with alkaline electrolytic liquids. Plastic support frames such as polyethylene and polypropylene can be advantageously used with acid electrolytes.

By the use of the support frame of the present invention, the long-term operational behavior of fuel cells can be improved considerably. It is possible to maintain a load which alternates daily between 300 and 440 mA/cm$^2$, even with a high gassing rate, over an operation period of more than 2,000 hours (with 6n KOH, potassium hydroxide, as the electrolytic liquid at a temperature of 80° C.).

DETAILED DESCRIPTION OF THE INVENTION

Figure 1:
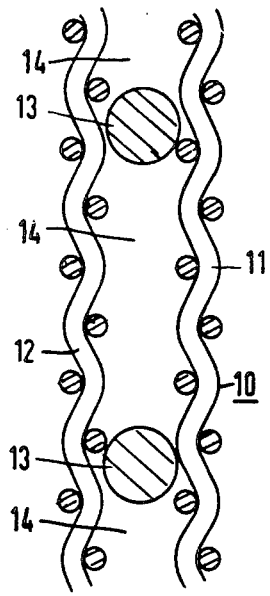
FIG. 1 is a partial cross-sectional view of a preferred embodiment of a support frame according to the present invention.

In FIG. 1, a partial cross section through a preferred embodiment of the support frame of the present invention is shown. The support frame 10 comprises two thin nickel screens 11 and 12 and a multiplicity of parallel spaced nickel wires 13 which are arranged between the screens 11 and 12. The wires 13 extend in the direction of flow of the electrolytic liquid and form flow canals 14 for the electrolytic liquid. The flow canals 14 are substantially free of constrictions, as can be seen from FIG. 1. The diameter of the nickel wires 13 is about 1.5 mm. The nickel screens 11 and 12, which have a mesh width of about 0.2 mm, are about 0.1 mm thick (wire thickness: 0.05 mm). The overall thickness of the support frame 10 is therefore approximately 0.7 mm. The frame has the dimensions 20 cm×20 cm and contains about 100 wires. Therefore, the mutual spacing of these wires is about 1.5 mm.

The wires 13 are connected by cementing or welding to at least one of the screens 11 or 12. Advantageously, the wires 13 can be worked into one of the screens 11 or 12 during the manufacture of the screens. In this process, the relatively thick wires 13 are woven, at an appropriate spacing, into the screen in place of one of the thin screen wires.

Figure 2:
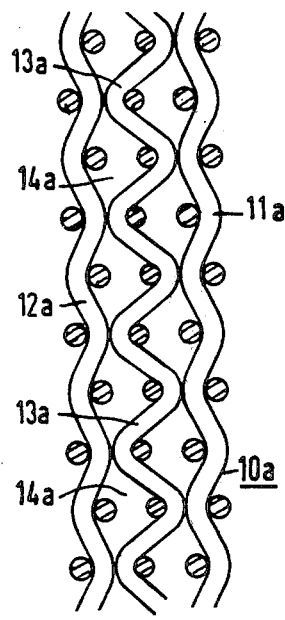
FIG. 2 is a partial cross-sectional view of an additional embodiment of a support frame according to the present invention.

An alternate embodiment of the present invention is illustrated on FIG. 2. Frame 10a, essentially of the same construction as that of frame 10 as shown on FIG. 1, is provided as before. However, in place of the wires 13 of FIG. 1 a corrugated screen 13a is provided. As illustrated, this screen can be of similar construction to the screens 11 and 12 but is bent so as to establish a plurality of flow channels 14a which are unobstructed.

Figure 3:
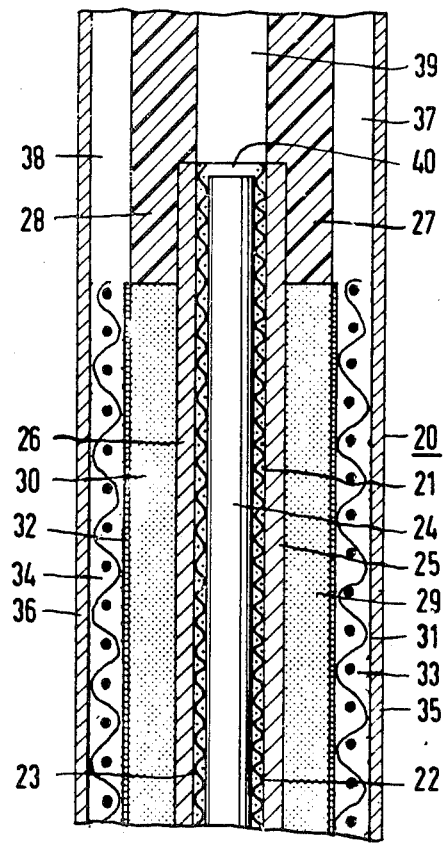
FIG. 3 is a partial cross-sectional view of a fuel cell containing a support frame according to the present invention.

FIG. 3 shows a partial cross section through a fuel cell 20 containing the support frame of the present invention. The support frame 21 has two screens 22 and 23, between which wires 24 are arranged in the flow direction. The screens 22 and 23 support the cover layers 25 and 26, consisting particularly of asbestos paper. Powder electrodes 29 and 30 are arranged at the cover layers 25 and 26, which are cemented into plastic frames 27 and 28. The powder electrodes 29 and 30 are provided with thin metal screens 31 and 32 for support and contacting. The screens 31 and 32 are followed by coarse mesh screens 33 and 34 which form the gas chambers. The fuel cell 20 is closed off by metal sheets 35 and 36. The respective gaseous operating materials such as hydrogen and oxygen, are fed to the gas chambers via lines 37 and 38. The electrolytic liquid is removed from the electrolyte chamber 40, which contains the support frame 21, via the canal 39 simultaneously with the gas bubbles leaving the electrolyte chamber.

Besides fuel cells, the support frame of the present invention can also be used in electrochemical cells such as metal/air cells.

What is claimed is:

1. In an electrode assembly including powder electrodes and a support frame therefor, said support frame being for use in an electrolyte chamber in an electrochemical cell, said support frame including flow passages for an electrolyte liquid, the improvement comprising:

the support frame comprising two thin porous boundary regions and a plurality of spaced parallel cross pieces disposed between said boundary regions, said cross pieces extending in the flow direction of the electrolytic liquid, for establishing flow passages in said support frame which are substantially free of constrictions in the flow direction, said support frame arranged between said powder electrodes, supporting and spacing said electrodes while at the same time conducting said electrolyte liquid.

2. The improvement according to claim 1 wherein said thin porous boundary regions comprise thin screens and wherein said cross pieces comprise wires extending parallel to each other in the flow direction of the electrolytic liquid.

3. In an electrode assembly including powder electrodes and a support frame therefor, said support frame being for use in an electrolyte chamber in an electrochemical cell, said support frame including flow passages for an electrolyte liquid, the improvement comprising:

the support frame comprising two thin porous boundary regions having disposed therebetween a screen of corrugated shape so as to form flow canals extending in the direction of flow of the electrolytic liquid, for establishing flow passages in said support frame which are substantially free of constrictions in the flow direction, said support frame arranged between said powder electrodes, supporting and spacing said electrodes while at the same time conducting said electrolyte liquid.

4. The improvement according to claim 3 wherein said support frame is made of a material selected from the group consisting of metal and plastic.

5. The improvement according to claim 3 wherein said support frame is made of nickel.

6. A method of constructing powdered electrodes and an electrode assembly including a support frame therefor; said support frame being for use in an electrolyte chamber in an electrochemical cell, comprising:

constructing the support frame of two thin porous boundary regions having disposed therebetween a screen of corrugated shape so as to form flow canals extending in the direction of flow of the electrolytic liquid, which are substantially free of constrictions in the flow direction; and supporting the supported powder electrodes in a spaced apart manner with said support frame.

* * * * *

UNITED STATES PATENT AND TRADEMARK OFFICE
CERTIFICATE OF CORRECTION

PATENT NO. :   4,225,411
DATED      :   Sept. 30, 1980
INVENTOR(S) :  Horst Grune It is certified that error appears in the above—identified patent and that said Letters Patent is hereby corrected as shown below:

Correct claim 6 at column 6, lines 6 and 7 to read:

"A method of constructing an electrode assembly including powder electrodes and a support frame".

Signed and Sealed this

Sixteenth Day of June 1981

[SEAL]

*Attest:*

RENE D. TEGTMEYER

*Attesting Officer*   *Acting Commissioner of Patents and Trademarks*